United States Patent [19]
Dawson et al.

[11] Patent Number: 5,594,490
[45] Date of Patent: Jan. 14, 1997

[54] SYSTEM FOR DISTRIBUTING VIDEO/AUDIO FILES FROM CENTRAL LOCATION TO A PLURALITY OF CABLE HEADENDS

[75] Inventors: William P. Dawson, Murray, Utah; Jay B. Schiller, Boulder, Colo.; Richard A. Schmelzer, Boulder, Colo.; Daniel J. Zigmond, Boulder, Colo.

[73] Assignee: Cable Services Technologies, Inc., Boulder, Colo.

[21] Appl. No.: 247,834

[22] Filed: May 23, 1994

[51] Int. Cl.⁶ .................................................. H04N 7/173
[52] U.S. Cl. ............................... 348/6; 348/12; 455/3.2; 455/5.1; 371/32
[58] Field of Search ........................ 348/6, 7, 10, 12, 348/13; 455/3.2, 5.1, 6.3, 12.1, 42; 371/8.1, 8.2, 32; H04N 7/16, 7/173, 7/20

[56] References Cited

U.S. PATENT DOCUMENTS

| | | | |
|---|---|---|---|
| 4,334,306 | 6/1982 | Ulug | 370/94 |
| 4,422,171 | 12/1983 | Wortley et al. | |
| 4,763,191 | 8/1988 | Gordon et al. | |
| 4,829,372 | 5/1989 | McCalley et al. | |
| 4,829,569 | 5/1989 | Seth-Smith et al. | 348/6 |
| 4,841,526 | 6/1989 | Wilson et al. | |
| 4,888,767 | 12/1989 | Furuya et al. | |
| 4,908,828 | 3/1990 | Tikalsky | |
| 4,920,432 | 4/1990 | Eggers et al. | |
| 4,939,731 | 7/1990 | Reed et al. | |
| 5,014,125 | 5/1991 | Pocock et al. | |
| 5,151,782 | 9/1992 | Ferraro | |
| 5,161,194 | 11/1992 | Ujiie | 455/12.1 |
| 5,172,413 | 12/1992 | Bradley et al. | |
| 5,191,410 | 3/1993 | McCalley et al. | |
| 5,216,515 | 6/1993 | Steele et al. | 348/6 |
| 5,220,420 | 6/1993 | Hoarty et al. | |
| 5,247,347 | 9/1993 | Litteral et al. | |
| 5,247,575 | 9/1993 | Sprague et al. | |
| 5,253,275 | 10/1993 | Yurt et al. | |
| 5,262,875 | 11/1993 | Mincer et al. | |
| 5,283,639 | 2/1994 | Esch et al. | 348/6 |
| 5,285,272 | 2/1994 | Bradley et al. | |
| 5,301,194 | 4/1994 | Seta | |
| 5,303,234 | 4/1994 | Kou | 370/85.2 |
| 5,345,594 | 9/1994 | Tsuda | 348/6 |
| 5,412,660 | 5/1995 | Chen et al. | 455/12.1 |
| 5,430,738 | 7/1995 | Tsuda | 371/32 |
| 5,440,336 | 8/1995 | Buhro et al. | 348/7 |
| 5,446,490 | 8/1995 | Blahut et al. | 348/7 |
| 5,481,546 | 1/1996 | Dinkins | 348/13 |
| 5,499,046 | 3/1996 | Schiller et al. | 348/6 |

FOREIGN PATENT DOCUMENTS

| | | | |
|---|---|---|---|
| 4308161 | 9/1994 | Germany | 455/12.1 |
| 97248 | 6/1982 | Japan | H04L 1/00 |
| 293020 | 11/1989 | Japan | 455/12.1 |
| 240926 | 8/1992 | Japan | 455/12.1 |

*Primary Examiner*—John K. Peng
*Assistant Examiner*—Chris Grant
*Attorney, Agent, or Firm*—Myers Liniak & Berenato

[57] ABSTRACT

A system and method for ensuring accurate reception of digitally encoded files that are transmitted in non-real time from a distribution station to a plurality of receiving stations, e.g. cable headends. Each file is divided into a plurality of data packets, with the packets being transmitted via satellite to the headends. Each headend determines which packets are in error (i.e. missing or jumbled) and need to be re-transmitted to the headend from the distribution station. After such a determination, each headend communicates a request over a land-link, e.g. telephone line or internet, to the distribution station requesting re-transmission of the packets in error. The distribution station then re-transmits these particular packets either via the land-link or the satellite. Re-transmission in non-real time via the land-link allows the headend to simultaneously receive packets via satellite and land-link so as to reduce the time taken to transmit files from the distribution station to the headends. The different land-links coupling the distribution station to each receiving station allow different data packets to simultaneously be re-transmitted to different receiving stations.

17 Claims, 6 Drawing Sheets

SYSTEM FOR DISTRIBUTING VIDEO/AUDIO FILES FROM CENTRAL LOCATION TO A PLURALITY OF CABLE HEADENDS

This invention relates to a system and method for distributing digital data files from a distribution station to at least one receiving station such as a cable headend. More particularly, this invention relates to a system for ensuring accurate reception of digitally encoded video/audio file packets transmitted from a distribution station to at least one cable headend.

BACKGROUND OF THE INVENTION

Multi-station communications in radio links, buss type wire-links, and other networks such as satellites, have the capability of delivering information to a plurality of receiving stations throughout the network by way of a single transmission. For instance, a satellite transmission generally may be simultaneously received by a plurality of separate and distinct receiving dishes.

A problem of longstanding concern arises when certain receiving stations determine that particular data packets of information received from the distribution station are in error (i.e. missing or jumbled) and require re-transmission. When a plurality of receiving stations simultaneously communicate their re-transmission requests to the central distribution station, these repeat request signals often conflict with one another thus resulting in communication error preventing the desired packets from being re-transmitted from the distribution station. As will be evident to those of skill in the art, such conflicts typically arise when a plurality of receiving stations share the same communication link with the distribution station thus leading to problems of multi-access.

Different types of communication links have typically been used for transfer of data. One type of common carrier communication link is terrestrial such as cable or leased phone lines. Other common carriers may include high speed satellite, microwave, or FM band links. Such links often have different lengths, operate at different error rates, and transfer data packets at different speeds. Because a variety of communication links having different characteristics may be available between two locations, it is advantageous to choose the communication link which is the most economical and efficient for the type of data transfer desired. It is therefore desireable to provide a communication system which is flexible, adjustable, and efficiently used for data transfer over communication links having different characteristics.

Because of the value and precision of data file transfer, it is important that all data be correctly transferred, particularly in the face of predictable errors caused in the communication links used for data transfer. Such errors are often caused, for example, in satellite links by bolts of lighting.

In response to such problems, conventional file transfer protocols (FTPs), such as Transmission Control Protocol/Internet Protocol (TCP/IP), based on a layered architecture have been developed for the transfer of data between remote computers or servers. Such protocols divide files into packets, add error identification data thereto, and then transmit the packets or frames so as to allow evaluation with respect to whether the packets are correctly received. The receiving station analyzes the error identification data and thus identifies packets in error. After such a determination is made as to which packets need to be re-sent, the receiving station typically communicates to the sending station which data frames or packets are in error and requests re-transmission of such frames.

A downside to such systems is that when different receiving stations request re-transmission of different packets, such re-transmission of different packets to different stations via satellite take up valuable satellite time and lengthens the time required to transmit and re-transmit the files to the different receiving stations. Furthermore, the aforementioned problem of multi-access arises when multiple receiving stations simultaneously attempt to request re-transmissions from the distributor via a common link such as a satellite channel, problems of multi-access also lengthening the time period required to transfer files from the distributors to the receiving stations.

U.S. Pat. No. 4,908,828 discloses a method for error-free file transfer and reception wherein a distribution station transmits/transfers files to a plurality of receiving stations. Each file to be transferred is divided into a plurality of data packets, these packets being transmitted from the distribution station to the receiving stations via the SCA band of an FM channel. In an effort to avoid the aforementioned problems which occur when receiving stations request re-transmissions of select packets in error, the distribution station of this patent cyclically re-transmits each packet for a predetermined number of transmission cycles, e.g. five. In other words, each file (made up of a plurality of packets) is transmitted five times. In such a manner, the receiving stations need not request re-transmission if certain packets are in error, they simply need wait for the next transmission cycle originating from the distribution station. Although the system of this patent may well perform satisfactorily, the need for up to five transmission cycles is undesirable in that it unduly ties up costly transmitter time and prevents additional data files from being transferred via the same link.

U.S. Pat. No. 4,422,171 discloses a method and system for data communication between first (sender) and second (receiver) stations. Files to be transferred from the first station to the second in this patent are divided into a plurality of data packets, each packet being transmitted via satellite from the sender to the receiver. The receiver station upon detecting errors in specific packets, transmits requests for re-transmission with respect to these specific packets back to the sender station. Such requests for re-transmission are also by way of satellite, as is the actual re-transmission of packets originally in error. The provision of two-way satellite communication in the data transfer system of this patent requires each station to have its own satellite transmitter and receiver (as opposed to only a receiver or transmitter) thus significantly increasing the cost of the system.

U.S. Pat. No. 5,301,194 discloses a communication system wherein a central office distributes file data in the form of data packets to a plurality of local or receiving offices. Upon detecting packet errors, the receiving offices transmit requests for re-transmission back to the central office with respect to the packets in error, these re-transmission requests being via satellite. Because communication between the central office and the plurality of local offices is solely via satellite, each local office is required to have its own satellite transmitter thus significantly increasing the overall cost of the system.

U.S. Pat. No. 4,841,526 discloses a data communication system wherein data is transmitted via satellite from a first station to a second station. The second station acknowledges correct data packet reception via either a satellite transmission or a telephone link connecting the first and second stations. However, re-transmission of packets originally in error is also done via satellite thereby significantly increasing the time taken for correct transmission of such files.

Another disadvantage of the U.S. Pat. No. 4,841,526 data transfer system arises when the sending station is transferring data to a plurality of receiving station. In such an environment this system re-transmits "different" data packets sequentially to the different receiving stations. For instance, assume that receiving station number 1 requires re-transmission of packet numbers 15–20, and station numbers 2 and 3 require re-transmission of packet numbers 32–50 and 61–64 respectively. Under such circumstances, the distributing or sending station must first transmit packet numbers 15–20 to station 1, then packet numbers 32–50 to station 2, and finally packet numbers 61–64 to station 3. This unfortunately ties up an extremely large amount of costly satellite time and/or bandwidth in that all three re-transmissions cannot be done simultaneously.

It is apparent from the above that there exists a need in the art for a file transfer communication system wherein data files may be transferred in packet form from a distribution station to a plurality of receiving stations (e.g. CATV headends) in a manner such that packets originally transmitted in error may be re-transmitted from the distribution station to the appropriate receiving station while at the same time the receiving station is still receiving packet data via satellite. Additionally, a need exists for different data packets to be simultaneously re-transmitted to different receiving stations. It would also be desireable if such a system were to avoid having a satellite transmitter disposed at each receiving station so as to reduce the overall cost of file transfer.

It is the purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing a method of transferring/transmitting a digital data file from a first station to a second station, the method comprising the steps of:

a) storing a plurality of digital data files in a storage area at the first station;

b) instructing a file server at the first station to transmit a file to the second station;

c) retrieving the file via the file server from the storage area at the first station;

d) dividing the file into a plurality of data packets, each packet having a header section and a data payload section;

e) adding error identification data to each of the packets;

f) transmitting the data packets via satellite to the second station;

g) analyzing the error identification data from each of the data packets at the second station so as to identify which of the packets are in error and need to be re-transmitted to the second station from the first station;

h) requesting, via a land-link connecting the first and second stations, the first station to re-transmit the packets identified in step g) to be in error;

i) re-transmitting from the first station to the second station via the land-link the packets requested in step h);

j) receiving the re-transmitted packets at the second station by way of a data interface device; and k) storing the re-transmitted data at the second station adjacent the previously transmitted correctly received and stored data of the file.

This invention further fulfills the above-described needs in the art by providing a system for transmitting video/audio digital file data from a distribution station to a plurality of cable television or CATV headends, the system comprising:

a hard drive storage disposed at the distribution station, the hard drive storage for storing digital video/audio files to be sent to the cable headends;

a file transmitter server (TS) located at the distribution station for retrieving files from the hard drive storage so that the files may be transmitted to the cable headends in less than real time;

means at the distribution station for dividing each of the files into a plurality of data packets, each packet having a data or payload section and a header section;

satellite transmission means for transmitting the data packets via satellite to each of the cable headends, each headend having receiving means for receiving the data packets from the satellite transmission means;

a land-link connecting each of the cable headends with the distribution station wherein the number of land-links substantially corresponds to the number of cable headends;

error detection means at each of the headends for identifying which, if any, of the packets received from the distribution station are in error and need to be re-transmitted;

re-transmission request means at each of the headends for sending an error signal over the land-link connecting the headend to the distribution station, the error signal identifying (positively or negatively) specific packets which need to be re-transmitted from the distribution station to the requesting headend(s);

re-transmission means at the distribution station for re-transmitting the specific packets identified by the re-transmission request means to the requesting headend(s);

decision making means at the distribution station for determining whether the re-transmission of the specific packets is to be done via the land-link or the satellite transmission means; and means at each of the headends for storing the received packet data, the received data to be distributed over a cable television network to a plurality of subscribers at a later time.

This invention will now be described with respect to certain embodiments thereof, accompanied by certain illustrations, wherein:

IN THE DRAWINGS

Figure 1:
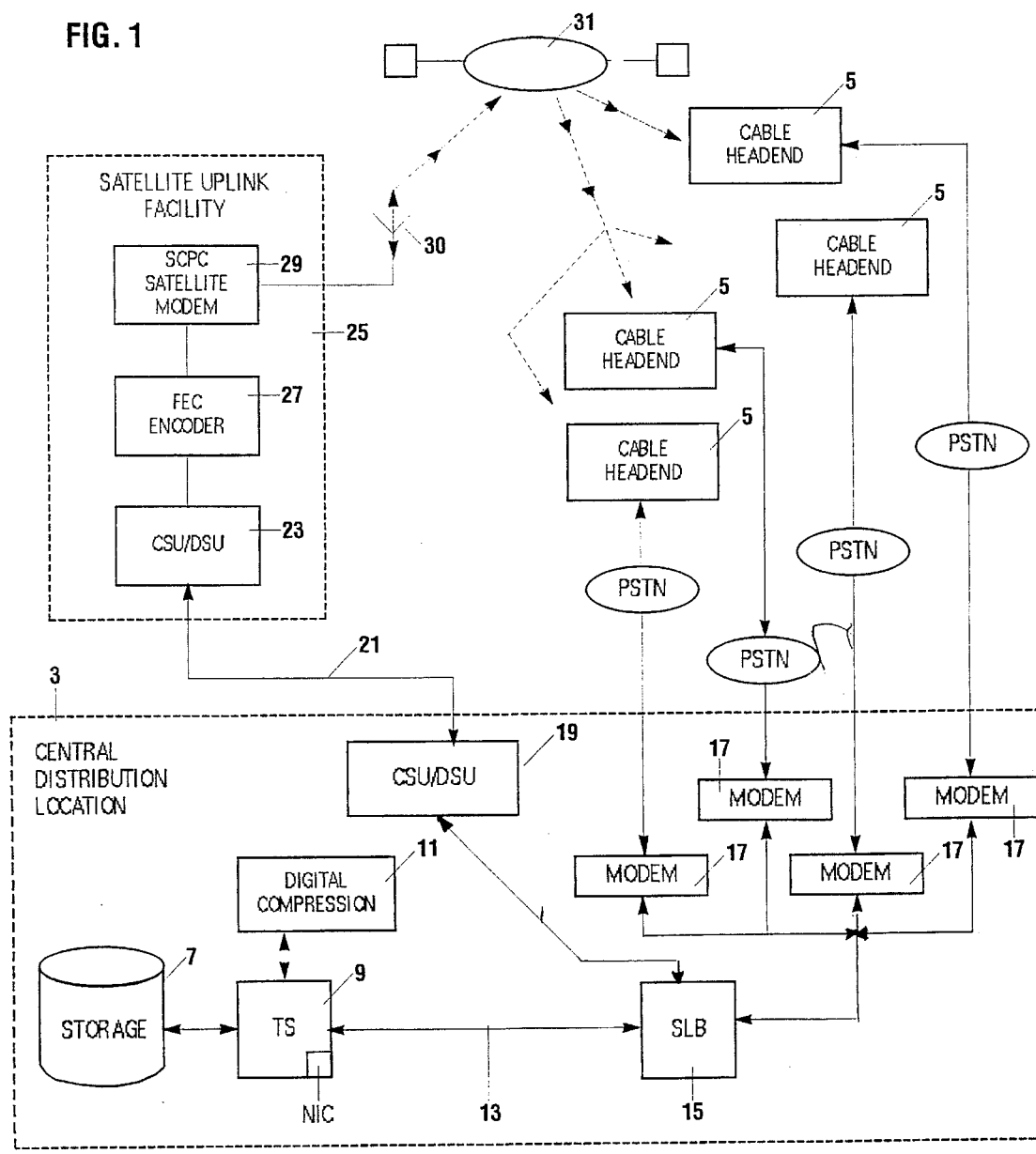
FIG. 1 is a block diagram illustrating a file transfer via data packet transmission system of a first embodiment of this invention, this figure illustrating communication components of both the distribution station and the satellite uplink facility.

FIGS. 5(a)–5(h) are illustrations of various en route data packets of certain embodiments of this invention.

DETAILED DESCRIPTION OF CERTAIN EMBODIMENTS OF THIS INVENTION

Referring now more particularly to the accompanying drawings in which like reference numerals indicate like parts.

Figure 2:
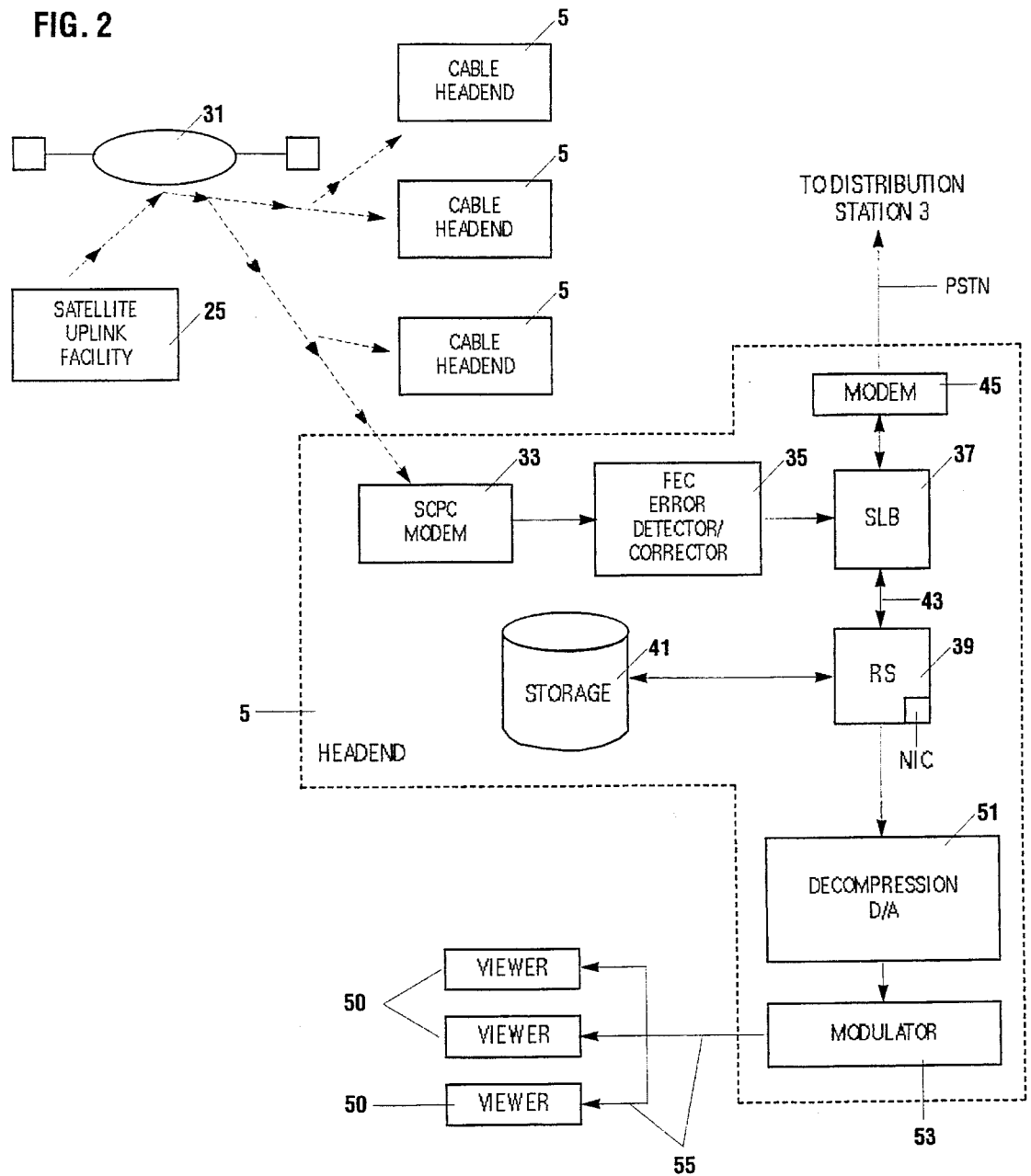
FIG. 2 is a block diagram illustrating the file transfer system of the FIG. 1 embodiment of this invention, this figure illustrating the communication components of a cable headend in communication with the central distribution station and satellite uplink.

FIGS. 1–2 are block diagrams according to an embodiment of this invention depicting a system for transferring digital data files from central distribution location or station 3 to a plurality of receiving stations (e.g. cable headends) 5. As shown in FIG. 1, central distribution station 3 includes hard drive storage 7, transmitter server (TS) 9 having a Network Interface Card (NIC) connected thereto, digital data compression station 11, local area network (LAN) 13 interconnecting transmitter server 9 and smart LAN-bridge (SLB) 15, a plurality of conventional modems 17 connected to SLB 15, and Customer Service Unit (CSU)/Digital Service Unit (DSU) 19.

Storage area 7 at distribution location 3 is of the hard drive type in certain embodiments of this invention, however, any conventional digital data storage will suffice. For example, hard drive storage 7 may be an optical disk drive(s) or library, magnetic disk library, tape library, etc., such libraries being conventional in nature as will be appreciated by those of skill in the art. Mircopolis 2217AV and Seagate Barracuda ST-12550W hard drives are two such commercially available examples.

Transmitter server (TS) 9 is a computer such as a high-powered PC which accesses hard drive(s) 7 so as to selectively retrieve desired digital data files therefrom. Server 9 typically is a computer driven by a high powered chip such as an Intel 486 or Pentium. Server 9 may be, for example, an Ambra Pentium DP60/PCI, an Ambra Pentium DP60 E/VL, or a Dell 486/66 EISA, all of which are commercially available.

Server 9 receives a COPY instruction referencing a particular file or files from either an operator or application software disposed either internal or external server 9, depending upon the desired application. An operator, for example, may utilize an adjacent keyboard (not shown) to instruct transmitter server (TS) 9 to retrieve and transmit certain files.

The aforesaid COPY instruction to TS 9, however, may instead be applied, for example, via traffic and billing software which instructs TS 9 that particular CATV headends 5 need certain advertisement and/or movie information at or by a particular time. Thus, TS 9 knows when and what file(s) to access in hard drive storage 7.

The COPY instruction given TS 9 instructs the server to access and copy a particular digital data file (e.g. video/audio file) from hard drive storage 7, the end result being that the copied file will be transmitted to one or more of CATV headends 5. The files accessible by the server (TS 9) may be, for example, advertisements, movies, cable television shows, or any other type of digital data file which may be transmitted to remote receiving station(s) such as cable headends 5.

Digital compression station 11 is linked to TS 9 thus enabling TS 9 to receive compressed files, such as video files, for storage in hard drive 7. For example, if video files are sent from a remote location to TS 9, such files may be compressed at station 11 before reaching TS 9 so as to allow more files to be stored in hard drive 7 and transmit files using less bandwidth. However, data compression is, as will be recognized by those of skill in the art, an optional feature in certain embodiments of this invention. If compression station 11 is to be provided, the files received by TS 9 may be conventionally compressed at station 11 using, for example, MPEG1 or MPEG2.

TS 9 communicates with smart LAN-bridge (SLB) 15 via local area network (LAN) 13. LAN 13 is a well-known data communication system that provides common access from peripherals such as disk drives, printers, bridges, etc. to computers such as server 9 including a user terminal. TS 9 includes network station software and a network interface adapter such as the Network Interface Card (NIC) shown in FIG. 1, thereby allowing communication between server 9 and the other elements in the system through a LAN cable such as a coax and/or fiber optic lines.

Examples of typical commercially available NICs are Standard Microsystems Corp. (SMC) LAN ET16C Elite and N.E.T. ATMX. Any of several local area network (LAN) configurations may be used in the different embodiments of this invention, the choice depending on the environment, size, and requirements of the system. Possible commerically available LANS include ARCnet, Ethernet, FDDI, token ring, etc.

After the digital video/audio files are retrieved from hard drive storage 7, server 9 transmits the optionally compressed files via LAN 13 to SLB 15. SLB 15, including a conventional LAN-bridge, forwards the file(s) to CSU/DSU 19. Alternatively, it is possible to incorporate SLB 15 into TS 9 in certain embodiments of this invention.

Using a conventional file transfer layered communication protocol such as TCP/IP, TS 9 segments or divides the retrieved file(s) into a plurality of data packets, these packets then being outputted via LAN 13 and SLB 15 to CSU/DSU 19. A version of TCP/IP which may be used in certain embodiments of this invention is commercially available from Novell which uses this version for its UnixWare product line.

TCP/IP is discussed and described in the following publications: (i) "Computer Networks," Second Edition by Andrew S. Tanenbaum (1989); (ii) "Frames, Packets, and Cells in Broadband Networking" by William A. Flanagan (1991); "Internetworking with TCP/IP," Second Edition, Vol. I, by Douglas E. Comer; and (iv) "TCP/IP Network Administration" by Craig Hunt describing Novell UnixWare, the disclosures of all of which are hereby incorporated herein by reference.

The TCP portion of TCP/IP ensures that each packet is given a sequential order so that the packets may be reorganized into proper order by the receiver. The TCP portion also provides error detection data which allows for acknowledgement (positive and/or negative) with respect to whether received packets are in error. The IP portion of TCP/IP provides Wide Area Network (WAN) addressing functions such as routing and the like, "IP" standing for "internet protocol." In other words, IP focuses on communications between hosts on different networks.

The segmenting of digital files into data packets is well-known in the art, each data packet including a data or payload section and at least one adjacent header and/or trailer section (see FIGS. 5(a)–5(h)). The data or payload section of each packet includes the digital video/audio information corresponding to a particular portion of each file and higher layer application overhead while the overhead section of each packet includes LAN address information (typically LLC and MAC), TCP/IP, and other known data relevant to the order in which the packets are transmitted, and other conventional header requirements.

SLB 15 may be, for example, a PC-type computer such as a Dell 486/66 EISA; an Ambra Pentium DP60/PCI; or an Ambra Pentium DP60 E/VL in certain embodiments of this invention. Such an SLB 15 is modified via hardware and software so as to be able to output TCP/IP packets to satellite uplink facility 25, receive requests for re-transmission from headends 5, interpret such requests, known when to retrieve data files from storage 7, and decide (along with PS 9 in certain embodiments) whether to output such re-transmissions via satellite 31 or by way of land-link such as PSTN shown in FIG. 1. SLB 15 is equipped with LAN-bridge software, an NIC, and other conventional additives which allow the SLB to perform the aforesaid functions. For example, SLB 15 includes software which allows it to send out (and receive) data packet transmissions via link 21 to satellite 31 and via modem(s) 17 to a headend 5. This software also allows SLB 15 to receive requests for re-transmission from headends 5 and accordingly access server 9 for retrieval of data. Later to be discussed steps 45 and 47 may also carried out via this software or in combination with TS 9.

In formatting the files into data packets or frames via TCP/IP, TS 9 generates block identification numbers in numerical sequence and assigns each such identification number to a particular data packet. Thus, each data packet or block has its own private identification or sequence number incorporated into its header field(s) prior to transmission.

When the data packets of a particular file finally reach CSU/DSU 19, they are directed over link 21 to CSU/DSU 23 at satellite uplink facility 25, link 21 being a bi-directional "T1" line (or lines) commercially available from U.S. West in certain embodiments of this invention. While link 21 is bi-directional in certain embodiments, it need not be as a conventional uni-directional link will suffice in other embodiments. Link 21 is typically required because station 3 is unlikely to be at a satellite uplink facility or teleport although such could be the case. CSU/DSUs 19 and 23 which are substantially identical may be, for example, conventional AdTran TSU T1 DSU/CSU with V.35 Interface in certain embodiments of this invention.

When the data packets from location 3 are carried using full duplex bi-directional "T1" line(s) 21 to satellite uplink facility 25, CSU/DSUs 19 and 23 are required to interface the "T1" link with locations 3 and 25. Alternatively, if "T1" is not used as link 21, CSU/DSUs 19 and 23 may be replaced with conventional data routers and corresponding data service (either dedicated or switched).

For example, if Asynchronous Transfer Mode (ATM) is used to transmit the data packets from station 3 to satellite uplink facility 25, the ATM network would be interfaced with stations 3 and 25 via conventional ATM router/ switches. A commercially available ATM router/switch is, for example, a ForeSystems ASX-100 plus LAX-20 LAN Access Switch. ATM as is known in the art provides flexibility and capacity to deliver multimedia services over the same pipeline thus enabling the system to deliver voice, video, and other file and packet data from station 3 to satellite uplink facility 25.

Link 21 connecting stations 3 and 25 is bi-directional in nature in certain embodiments of this invention thus allowing the TCP/IP file packets to be transferred from station 3 to uplink 25 while simultaneously or otherwise allowing uplink facility 25 to transmit flow control information back to distribution station 3 in the event that the data packets are being transmitted, for example, too fast or too slow from TS 9 to facility 25. However, the link could be simplex and operate without this feature.

Other examples of links 21 which may be used are SMDS available from Bell Atlantic and Frame Relay available from Sprint. If Frame Relay is used, CSU/DSUs 19 and 23 are replaced with Frame Relay Routers such as ACC Access/ 4500 Enterprise.

After the data packets reach CSU/DSU 23 (or other conventional data router) at uplink facility 25 (e.g. IntelCom Group and Nova Net), the data packets are forwarded to optional FEC encoder 27. Thus, encoder 27 adds a forward error correction (FEC) code to the data in certain embodiments, this FEC addition being conventional and well-known throughout the art. The addition of the forward error correction data by encoder 27 to each packet will raise the overall bandwidth required for satellite transmission by a significant amount.

Another advantage of certain embodiments of this invention is the ability to either downsize or eliminate the FEC added via encoder 27. Because TCP/IP includes error identification, the satellite FEC data may be sacrificed. Therefore, encoder 27 and FEC error detector/corrector 35 are optional.

The FEC coded data is then passed to conventional SCPC satellite modem 29 which modulates the data packets onto a carrier frequency and transmits them via transponder 30 and satellite 31 to the plurality of CATV headends 5. Generally, the packets are uplinked to only a segment or fraction of satellite transponder 30 although the entire transponder may be used. Such a segmented or fractional use of transponder 30 is known in the art as single carrier per channel (SCPC) satellite transmission.

Each CATV headend 5 has a conventional satellite dish (e.g. obtained from Scientific Atlanta) or antenna directed at transponder 30 thus allowing each headend 5 to receive the data packets which are then subsequently passed from the respective satellite dishes to the SCPC modem 33 located at each headend 5. SCPC satellite modems 29 and 33 in certain embodiments of this invention may be, for example, Digital Equipment Corp. DCC 4014A.

Alternatively, the data packets may be transmitted to headend(s) 5 by way of Spread Spectrum and/or Code Division Multiple Access (CDMA) instead of satellite. Two conventional methods of such transmission are known in the art as "Frequency Hopping" and "Direct Sequencing." This type of transmission may be carried out via conventional microwave transmitters and receivers available from Western Multiplex, such transmissions being of the point-to-point type.

FIG. 2 is a block diagram illustrating the reception by each of four separate cable headends 5 of the file packet data from satellite 31, this figure enlarging one such headend so that a general block diagram of its elements may be illustrated, each headend 5 of course being similar in design.

SCPC modem 33 at headend 5 receives the data packets and thereafter demodulates the data stream before directing the packets to forward error correction (FEC) detector/ corrector 35. FEC error detector/corrector 35 performs conventional forward error correction (i.e. analyzes the data to identify error and corrects such error) with respect to the FEC error data and at the same time removes the FEC data which was added by encoder 27. It is noted at this time that RS 39 performs the TCP/IP (and LAN protocol) error detection on each packet.

Thus, each headend 5 performs an FEC error check utilizing FEC error detector/corrector 35 on all received data when the data is FEC encoded at encoder 27. When detector/corrector 35 realizes via FEC that certain data was received in error (i.e. was not properly transmitted), detector 35 identifies such packets and subsequently corrects such errors in a conventional manner.

FEC error detector/corrector 35 forwards all correctly FEC received data packets to SLB 37. With respect to the data correctly received with respect to FEC, SLB or smart LAN-bridge 37 forwards it to receiver server (RS) 39 which stores the received data in hard drive storage 41 after discarding overhead such as headers and trailers.

RS 39 performs the conventional receiver TCP/IP and LAN protocol error detection and identifies packets in error which need to be re-transmitted. RS 39 forwards TCP/IP correctly received packets (absent overhead) to storage 41 and sends a packet or packets identifying those in error to SLB 37 so that SLB 37 can forward corresponding requests for re-transmission to station 3 via modem 45 or other conventional data interface device.

An example of a conventional hard drive 41 is the Seagate Barracuda ST-12550W. Receiver server (RS) 39 is a computer powered by, for example, an Intel 486 or Pentium chip, the RS and SLB 37 being the brains of headend 5. RS 39 may be, for example, a Dell 486/66 EISA, an Ambra Pentium DP60/PCI, or an Ambra Pentium DP60 E/VL. RS 39 includes a conventional NIC which allows communication via LAN 43 interconnecting RS 39 and SLB 37.

In the event that certain packets received by CATV headend 5 are found by RS 39 to be in TCP/IP error, gaps or holes are left between the data received in hard drive storage 41 so that the correct packet data to be later received via re-transmission from station 3 may be inserted therein, these holes being disposed between the adjacent sequentially correct received and stored data.

When RS 39 determines by way of TCP/IP that certain data packets received from satellite 31 are in error, this information is forwarded to smart LAN-bridge 37 which accesses modem 45 for a re-transmission request communication with a modem 17 at distribution station 3. Modem 45 communicates with a corresponding modem 17 at distribution station 3 via a conventional point-to-point landlink such as a public switched telephone network (PSTN) or internet. While PSTN is used as an example of an acceptable land-link herein, those of skill in the art will appreciate that any conventional point-to-point communication link will suffice in certain embodiments of this invention. PSTN, for example, may include a fiber optic link or alternatively a coaxial and twisted pair connection.

While a modem 17 corresponding to each headend 5 is shown in FIG. 1, one common modem could alternatively be provided such that all headends 5 access a single modem.

Upon identifying a packet in error via TCP/IP and/or LAN protocol, headend 5 via modem 45 immediately or otherwise transmits a corresponding request for re-transmission (either a positive or negative acknowledgement) to distribution station 3 via the PSTN. TS 9 and SLB 15 at station 3 receive such requests for re-transmission via modem(s) 17. Alternatively, headend 5 may wait until the entire file has been transmitted or until a predetermined number of packet errors have been identified until transmitting its requests for re-transmission to station 3.

SLB 37 (or SLB 37 in combination with RS 39 in certain embodiments) of headend 5 may communicate to station 3 that certain packets are in error (i.e. request re-transmission) in a plurality of ways. For example, SLB 37 via modem 45 may send a stream of packet data over the PSTN to distribution station 3, the data stream acknowledging the correct reception of packets and failing to mention or recognize packets received in error. In other words, a packet (or multiple packets) is sent from headend 5 to station 3 (via the PSTN) which identifies all packets correctly received. In response, SLB 15 (and TS 9 in certain embodiments) at station 3 determines by way of such omissions which packets were not correctly received, i.e. all packets not acknowledged must be in error and need to be re-transmitted to the acknowledging headend 5.

Another way in which each headend 5 may communicate a request for re-transmission with respect to a particular packet in error to distribution station 3 is by way of a power burst corresponding to a particular time slot identified as matching up with the particular packet. Such a system is disclosed in U.S. Pat. No. 4,888,767, the disclosure of which is incorporated herein by reference. If such a system is used, station 3 determines via the burst signals which packets need to be re-transmitted and thereafter carries out this function.

In certain embodiments of this invention, SLB 37 via modem 45 transmits over the PSTN to station 3 data only identifying data packets received in error via satellite 31 which must be re-transmitted. In response to such PSTN transmissions, TS 9 and SLB 15 retrieve and re-transmit only those packets mentioned in the re-transmission request signal transmitted from each headend 5.

SLB 37 at each headend 5 may be a computer such as a Dell 486/66 EISA; an Ambra Pentium DP60/PCI; or an Ambra Pentium DP60 E/VL. Such SLB computers, of course, are to be provided with hardware and software which enable them to carry out the aforesaid functions. SLB 37 may include a LAN-bridge and software permitting it to receive incoming packets from satellite 31 and modem 45, receive error identification packets from RS 39, and send out requests for re-transmission via modem 45 and PSTN.

Figure 3:
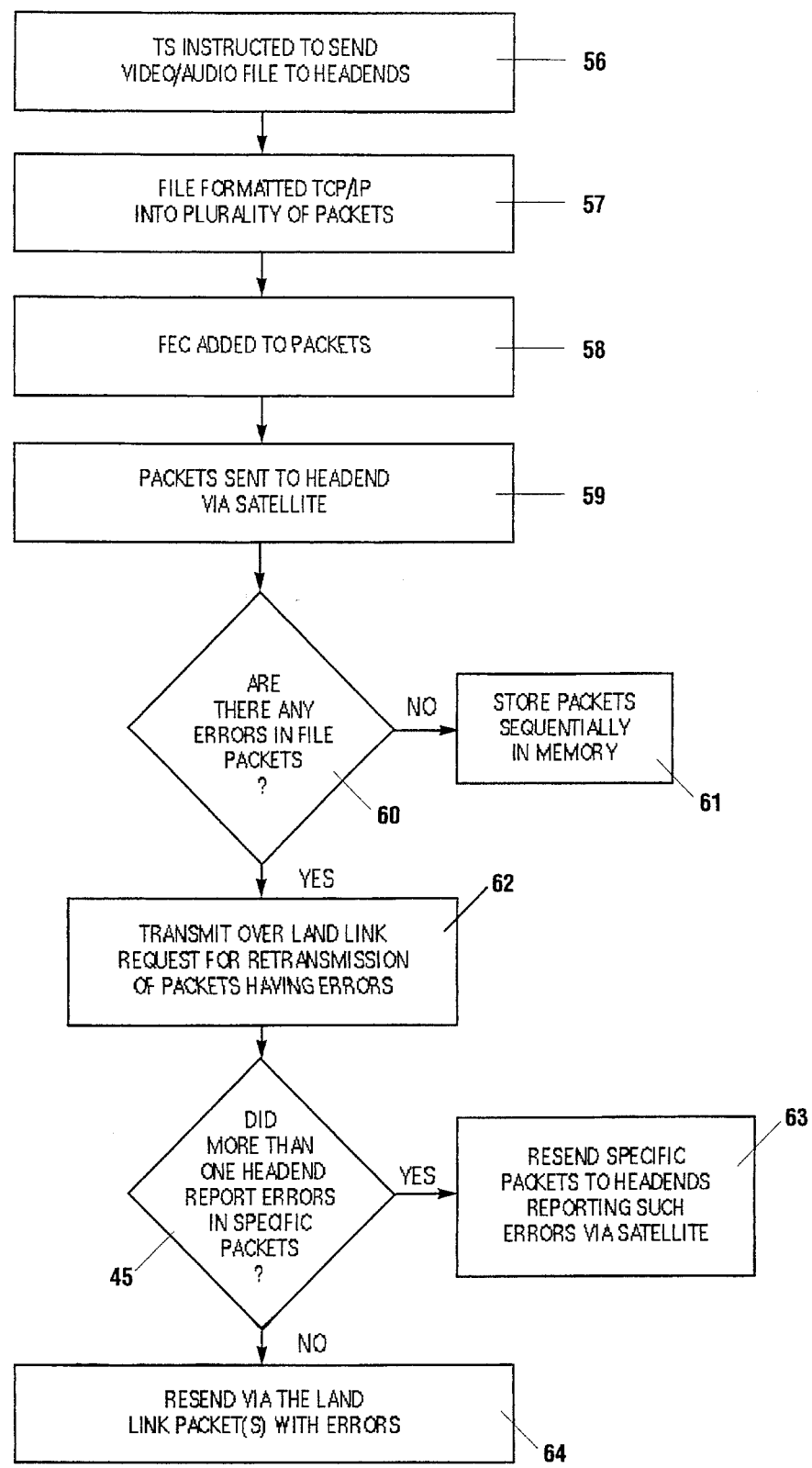
FIG. 3 is a flow chart illustrating the operation of the communication system of FIG. 1 according to an embodiment of this invention.
Figure 4:
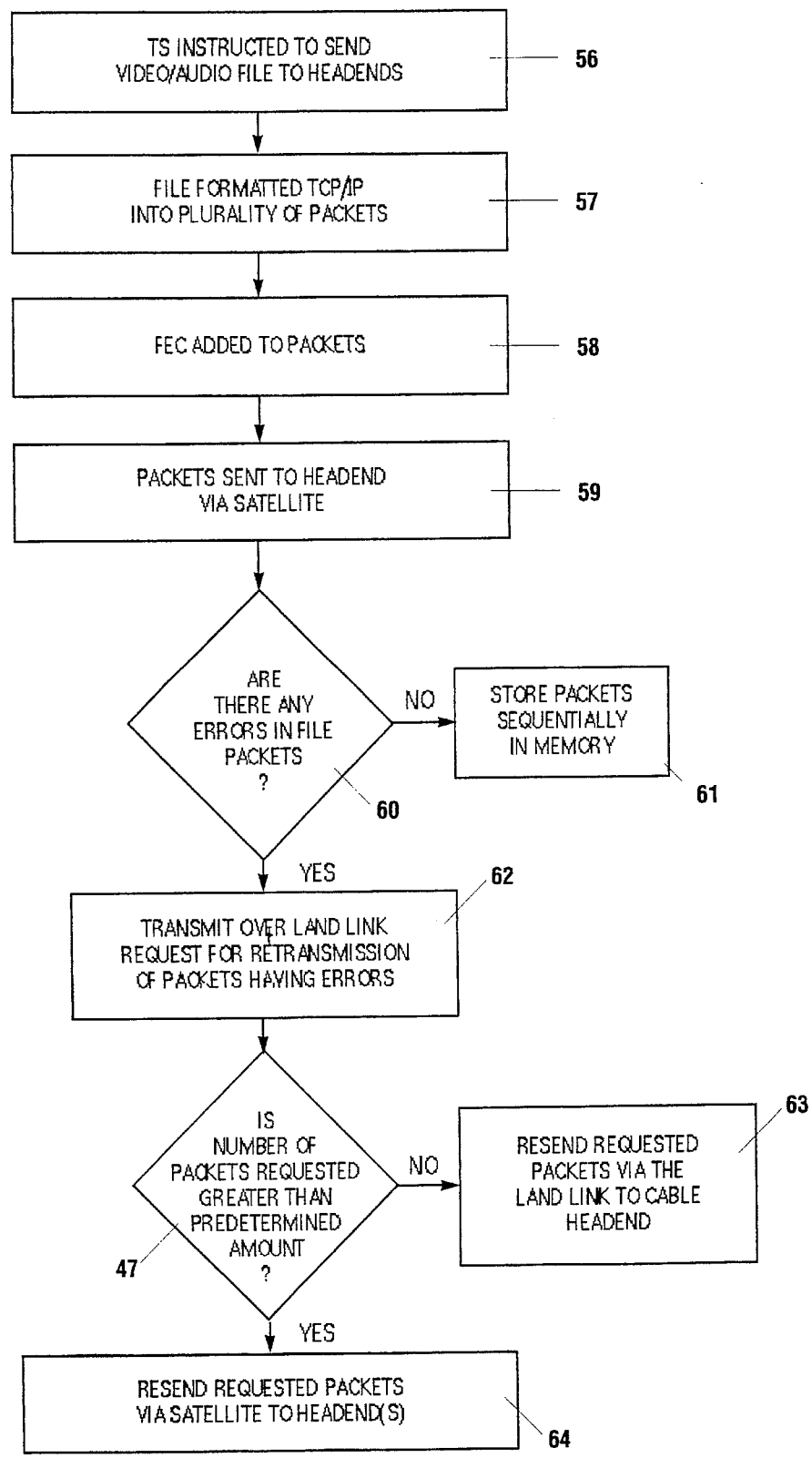
FIG. 4 is a flow chart illustrating the operation of the aforesaid communication system according to yet another embodiment of this invention.

With respect to FIGS. 3–4, a flow chart is shown illustrating the basic steps of two different embodiments of the file transfer system of this invention. Steps 56–64 of both the FIG. 3 and FIG. 4 embodiments are identical as is evident by the corresponding figures. The difference between these embodiments lies in step 45 of FIG. 3 versus corresponding step 47 of FIG. 4. Steps 45 and 47 are alternative decision making steps used in determining whether the re-transmission of packets originally in error is to take place over a land-link (e.g. PSTN) or via satellite 31. Alternatively, a decision making step combining steps 45 and 47 could be used.

With respect to FIGS. 3–4, SLB 15 (or SLB 15 in combination with TS 9 in certain embodiments) at station 3 upon receiving requests for re-transmission (step 62 of FIGS. 3–4) of particular packets, first instructs TS 9 to retrieve the particular data which includes the packets to be re-transmitted from hard drive storage 7.

After or while TS 9 at station 3 retrieves and formulates the packets to be re-transmitted from hard drive storage 7 and forwards them via LAN 13 to SLB 15, the decision must be made by SLB 15 whether to re-transmit such packets via satellite 31 or the land-link (e.g. PSTN or internet) coupling station 3 with the receiving cable headend 5. Such a decision may be made in a number of different ways, two of which are indicated by steps 45 and 47 in FIGS. 3 and 4 respectively.

The first way in which such a decision may be made with respect to the re-transmission medium of a particular packet is by determining whether more than one cable headend 5 reported an TCP/IP error in this particular packet and requested re-transmission (see step 45 in FIG. 3). If, for example, four headends 5 reported errors with respect to the same TCP/IP packet, it may be economically advantageous to re-transmit this particular packet via satellite 31 so as to allow a single transmission to satisfy all four headends 5 as opposed to making four separate PSTN transmissions.

Therefore, if it is determined in step 45 that more than one (or some other desirable threshold number) headend requires re-transmission of a particular packet, the packet at issue may be transmitted via satellite 31 as described above so that one satellite communication enables all four headends to re-receive the packet originally transmitted in error. However, if only one headend 5 requests re-transmission with respect to a particular packet, it would be advantageous with respect to time and money to re-transmit this packet to the requesting headend 5 via the PSTN link connecting station 3 and the requesting headend. Such a re-transmission via the PSTN (or internet) would allow requesting headend 5 to continue receiving the file data packet stream from satellite 31 while simultaneously re-receiving the re-transmitted packet previously received in error via the land-link thereby shortening the time period required for transmission of the entire file (plurality of packets) correctly from station 3 to headend 5. The threshold value of requesting headends to be used in making such a determination may, of course, vary depending upon economic considerations such as requisite time and cost of transmission. Such a PSTN or other conventional land point-to-point re-transmission also reduces costly satellite transmission time.

The provision of a separate land-link between each headend 5 and station 3 also allow station 3 to simultaneously re-transmit different packets to a plurality of headends (e.g. packet number 15 to headend A and simultaneously packet number 59 to headend B) thus speeding up the delivery of files to the different headends.

Alternatively, the decision whether or not the re-transmission should be made via land-link (e.g. PSTN) or satellite 31 may be made in accordance with step 47 of the FIG. 4 embodiment in that distribution station 3 determines the medium (PSTN or satellite) of re-transmission on the basis of the bulk or number of data packets to be re-transmitted to a particular headend(s). For example, if the amount of data, i.e. number of packets, requested by a particular headend cannot be re-transmitted via the PSTN in a reasonable time period, then such a re-transmission would instead be carried out via satellite 31 so as to allow the packets to be received by the requesting headend(s) in a reasonable amount of time. The threshold number of packets or bulk of data to be considered in making such a decision may, of course, vary in accordance with the capabilities of the system and links being used.

An example of the decision making process of step 47 in FIG. 4 is as follows. Assume that packet numbers 1–100 were originally transmitted from distribution station 3 to five different headends 5 (i–v). Headends i, iii and iv reported all packets as being correctly received. However, headends ii and v reported packet numbers 50–80 as being received in error and requested re-transmission. In accordance with step 47, SLB 15 at distribution station 3 decides that the amount of data corresponding to packet numbers 50–80 is too great to send via the corresponding PSTN links and therefore re-transmits these packets via satellite 31 to headends ii and v. In accordance with this decision, headends i, iii and iv are alerted via a signal forwarded thereto via the appropriate PSTN links that such a re-transmission of packet numbers 50–80 is going to occur and because these headends (i, iii, and iv) have already correctly received these packets, they should ignore the re-transmission. If, however, headends ii and v reported only packet number 53 as in error, station 3 would re-transmit this packet via the PSTN to headends ii and v only.

Thus, the provision of a land-link (e.g. PSTN) between each headend 5 and station 3 as well as the satellite transmission capability between station 3 and respective headends 5 allows each headend 5 to more efficiently and quickly receive data files than was previously possible.

With respect to FIG. 2, the re-transmitted packets are received either via SCPC modem 33 or land-link modem 45 depending upon the aforesaid medium of transfer decided upon in accordance with step 45 or step 47. After reception via satellite 31 of the re-transmitted packets, the data is checked for FEC errors and corrected at detector/correctors 35, forwarded to SLB 37, and then to RS 39 where the packets are checked for TCP/IP and/or LAN protocol errors. Subsequently, the data is stored after removing overhead in hard drive storage 41. Re-transmitted packets received via modem 45 are simply checked for error via TCP/IP at RS 39 and thereafter stored.

The re-transmitted packets are stored in the aforedescribed holes left therefore in hard drive 41. For example, if packet numbers 1–100 were previously transmitted and only packet numbers 1–62 and 64–100 were correctly received, data from these packets was stored in hard drive storage 41 and a gap or hole was left between the data of packet numbers 62 and 64 for storage of the later to be received re-transmitted packet number 63 data. Thus, when re-transmitted packet number 63 reaches RS 39, its data is stored in storage 41 in the aforesaid hole or gap previously left.

After an entire file is correctly stored by RS 39 in hard drive storage 41 at headend 5, the file may be selectively retrieved by RS 39 for transmission to, for example, home viewers 50 over cable television network 55. Upon retrieval from storage 41 for transmission, retrieved video/audio (or other digital data) files are processed from server 39 to decompression station 51. The video/audio data of the files are both decompressed and switched from digital to analog at station 51 before being modulated by modulator 53 and thereafter sent over cable television network 55 to a plurality of viewers 50. While cable TV (video/audio) file distribution is used as an example herein, this system allows any other file types to be used in conventional manners as distributed by RS 39.

Figure 5A:

FIGS. 5(a)–5(e) illustrate the sequential make-up of a data packet as it proceeds in distribution station 3 from hard drive storage 7 to SLB 15. FIG. 5(a) illustrates the raw data or payload file retrieved from hard drive 7. At TS 9, the retrieved file is divided into a plurality of data packets as described above.

Figure 5B:
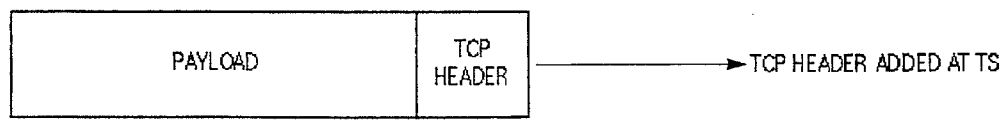
Figure 5C:
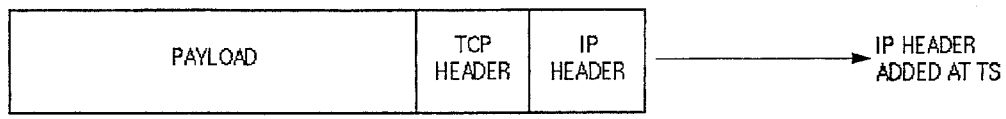
Figure 5D:
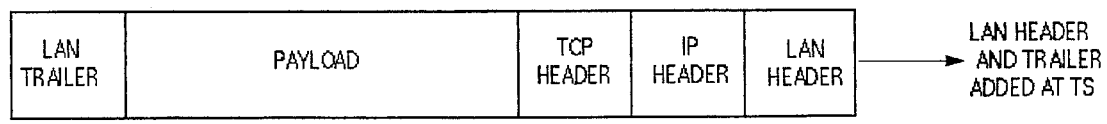
Figure 5E:
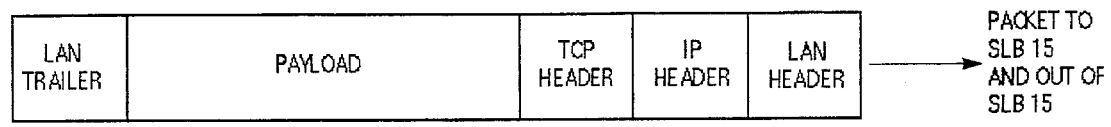
Figure 5F:
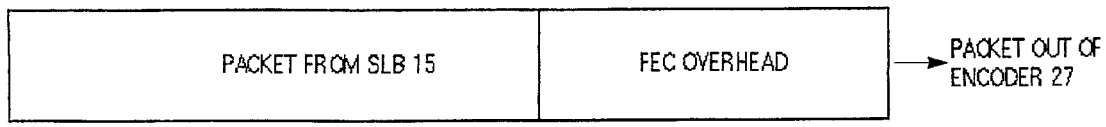
Figure 5G:
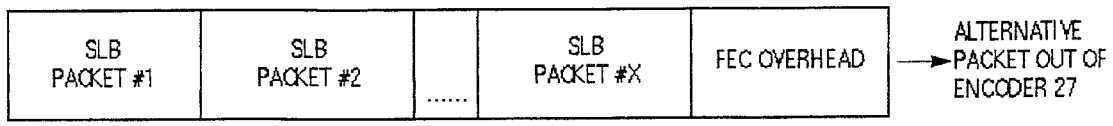
Figure 5H:
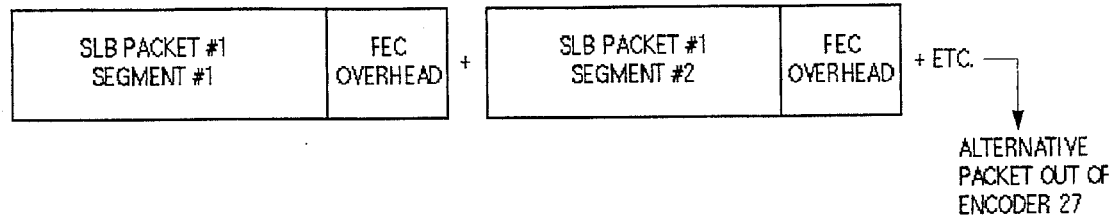

FIG. 5(b) illustrates a particular data packet formed at TS 9 after the TCP header has been added to the payload section of the packet. Following the addition of the TCP header, the IP header is added to the packet as shown in FIG. 5(c), this addition also occuring at TS 9. After the above TCP/IP headers have been added to the payload section of each packet, LAN protocol headers and trailers are added to each packet or frame at TS 9 as shown in FIG. 5(*d*). After the LAN protocol sections are added, the data packets are transmitted from TS 9 to SLB 15 thus allowing SLB 15 to receive and output to CSU/DSU 19 data packets in the form shown in FIG. 5(*e*).

Each data packet or frame substantially maintains its form shown in FIG. 5(*e*) as is transmitted from SLB 15 through link 21 to satellite uplink facility 25. Then, at optional FEC encoder 27, the FEC overhead section is added as shown in FIG. 5(*f*). Alternatively, an FEC overhead section may be added to a plurality of data packets coupled together as shown in FIG. 5(*g*). Another alternative would be to segment each packet into multiple sections as shown in FIG. 5(*h*) and thereafter add an FEC overhead portion to each segment. Accordingly, after the FEC data is added as shown in the alternatives of FIGS. 5(*f*)–5(*h*), the packets are transmitted from encoder 27 through modem 29 to a plurality of headends 5 via satellite 31.

The aforesaid LAN protocol header is for LAN 13 or other data link protocol carrying the IP. Typical LAN protocols utilize communication layers known as MAC and LLC.

The Transmission Control Protocol (TCP) header as shown in FIGS. 5(*b*)–5(*e*) includes sequence numbers so as to ensure that the data packets are received in correct order and that none is missing. The sequence number in each packet is unique, the number of each packet being one greater than the previous. If the receiver fails to get a packet with a specific number, the receiver, namely TS 39, may stop acknowledging packets starting with the last one received in proper order. Station 3 will then re-transmit or repeat the missing packet until it is acknowledged by RS 39 at a particular headend 5 by having its sequence number appear in an acknowledgement packet coming back from a headend 5. This is one way in which headends 5 indicate that certain data packets are in error and thereafter acknowledge receipt of same.

In a typical operation of the embodiment of this invention shown in FIGS. 1–3, an operator via a keyboard (not shown) or an appropriate automated software package, sends a copy command to TS 9 at station 3 requesting that certain compressed video/audio file(s) be transmitted to particular cable headend(s) 5. In accordance with the copy instructions, TS 9 accesses and retrieves a particular compressed digital data file from hard drive storage 7. After the file is retrieved, TS 9, via, for example, conventional file transfer protocol TCP/IP, segments or divides the file into a plurality of digital data packets. TCP/IP ensures proper final delivery of the data packets making up the file.

In accordance with the file transfer protocol utilized, each data packet includes a data or payload section and at least one adjacent header section having address and sequence information therein. For the purpose of example, let us assume that the retrieved video/audio file was segmented into 100 packets which are arranged in sequential order from 1 to 100. The header section of each packet formed at TS 9 includes therein the sequence number of that particular packet so that the stream of packets may be re-organized in proper or sequential order after or during the transmission process from TS 9 to RS 39 and so that packets in error or not received may be identified.

After the file has been segmented via TCP/IP, TS 9 via its NIC accesses LAN 13 and sends the stream of data packets to SLB 15 which, recognizing that this is an original transmission, forwards the stream of data packets toward satellite uplink facility 25 via link 21.

Facility 25 and station 3 are connected via link 21, this link being, for example, T1 available from U.S. West. CSU/DSU 19 allows SLB 15 to interface and access link 21 so as to send the stream of packets making up the video/audio file to uplink facility 25. CSU/DSU 23 allows facility 25 to interface T1 link 21 and accept the incoming data packets, CSU/DSU 23 operating in reverse with respect to CSU/DSU 19 in that CSU/DSU 23 carries out a receiving function while 19 carries out an access and forwarding function.

After reaching uplink facility 25, optional FEC encoder 27 adds conventional forward error correction (FEC) data to the file data made up of the packets. Now, the file including the packets is fully formed and ready for satellite transmission. Next, the packets are forwarded to SCPC satellite modem 29 which modulates them onto a carrier frequency for satellite transmission via transponder 30. The data packets are transmitted from transponder 30 via satellite 31 to corresponding transceivers (not shown) located at each cable headend 5 in a substantially continual stream of packet transmission. Alternatively, the packets may be transmitted via microwave CDMA, FM frequency, or the like from station 25 to headend(s) 5 in certain embodiments of this invention.

A satellite dish (not shown) or appropriate antenna (not shown) at each headend 5 receives the transmission of data packets and forward these packets to SCPC modem 33 which demodulates and forwards the packets to optional FEC error detector/corrector 35. Detector/corrector 35 in a conventional manner analyzes and removes the FEC data previously added by encoder 27 so as to determine which data has been properly received with respect to FEC. Subsequent to determining such FEC errors, detector/corrector 35 corrects these errors in accordance with FEC.

RS 39 checks incoming packets for error using TCP/IP (and sometimes the LAN protocol). For example, if RS 39 in analyzing the packet stream determines that it has correctly received packet numbers 1–42, 44–90 and 99–100, the data from these correctly received packets is forwarded to storage in hard drive 41 with holes being left in memory slots corresponding to where the data from packet numbers 43 and 91–98 is later to be stored. Header and trailer portion are discarded before the data from the packets is stored in hard drive 41.

With respect to packet numbers 43 and 91–98 which were incorrectly received, RS 39 forwards a list, via one or more transmissions or packets, of these particular packets to SLB 37 which in turn accesses conventional modem or other conventional data interface device 45 and the PSTN (or internet) linking headend 5 and distribution station 3. SLB 37 may send nine packets (or a single packet) of data via PSTN to distribution station 3, each packet corresponding to a particular packet in error, namely packet numbers 43 and 91–98 (this is termed a "negative" acknowledgement). These packets transmitted from modem 45 to a corresponding modem 17 at station 3 are conventional in nature. SLB 15 at station 3 receives these packets from headend 5 and interprets them as requests for re-transmission of packet numbers 43 and 91–98 to headend 5 which will hereinafter in this section be termed headend "A".

SLB 15 and/or TS 9 in response to the requests for re-transmission access storage 7 and retrieve the data (compressed or uncompressed) from the file at issue. TS 9 then segments the data and divides out packets 43 and 91–98 to be re-transmitted in accordance with TCP/IP. Only these packets are forwarded to SLB 15. In accordance with step 45 in FIG. 3, SLB 15 and/or TS 9 determines whether or not more than one headend requested re-transmission of packet numbers 43 and 91–98.

Let us assume for the purpose of example that three other headends (headends "B," "C," and "D") all requested re-transmission of packet numbers 91–98 of this particular file, however, only the first headend (headend "A") requested re-transmission of packet number 43. In such a case, in accordance with step 45, packet number 43 would be re-transmitted via modem 17 and the appropriate PSTN link to headend "A" so that packet number 43 may be re-transmitted without tying up expensive satellite transmission time and headend "A" may simultaneously receive re-transmitted packet 43 along with other satellite data such as packet numbers 91–98. Headend "A" receives packet number 43 via modem 45 and forwards it to RS 39 where it is checked for TCP/IP error to see if it needs to be re-transmitted.

With respect to packet numbers 91–98, because four separate headends requested re-transmission of these packets, depending upon the capacity of the PSTN network, these packets may be re-transmitted via satellite 31 to headends "A"–"D" in accordance with step 45 thus allowing a single satellite transmission to transmit these packets to all four headends as opposed to utilizing four separate PSTN links for the extended periods of time required to transmit eight such data packets.

Upon receiving the re-transmitted packets, each headend 5 directs them to its hard drive storage 41 where the now correct data from the packets is stored (after the header and trailer sections are discarded) in the previously provided holes or gaps left in their corresponding file. Thus, the file transmitted via packet numbers 1–100 has now been successfully transmitted from location 3 to headend(s) 5.

As will be appreciated by those of skill in the art, station 3 may also simultaneously re-transmit different packets via PSTN to different headends.

The above-described and illustrated elements of the various embodiments of this invention are manufactured and connected to one another by conventional methods commonly used throughout the art.

Once given the above disclosure, therefore, various other modifications, features, or improvements will become apparent to the skilled artisan. Such other features, modifications, and improvements are thus considered a part of this invention, the scope of which is to be determined by the following claims.

We claim:

1. A method of transmitting a digital video data file from a distribution station to a cable television or CATV headend, said method comprising the steps of:
    a) selecting a data file at said distribution station for transmission to said cable headend;
    b) after said selecting step, dividing or segmenting said digital data video file into a plurality of data packets, each packet including a header and a data payload section;
    c) using a satellite to transmit said data packets to said cable headend;
    d) identifying at said headend which of said packets are in error and need to be re-transmitted from said distribution station to said headend;
    e) requesting from said headend that said distribution station re-transmit said packets identified as being in error;
    f) deciding at the distribution station whether re-transmission is to be done via a land-link or via the satellite; and
    g) re-transmitting said identified packets from said distribution station to said headend over one of said land-link interconnecting said distribution station and said headend and said satellite as determined in said deciding step so as to allow said headend to more quickly and economically receive said video file.

2. The method of claim 1, wherein said step g) further includes re-transmitting said identified packets while said headend is at the same time receiving packets from said satellite thereby reducing the time needed to transmit said file from said distribution station to said headend.

3. The method of claim 2, further including the steps of:
    h) decompressing said video data at said headend after said file has been completely and correctly received; and
    i) modulating said video data at said headend after step h) and subsequently sending it to a plurality of home viewers via a cable television network.

4. The method of claim 3, further comprising the steps of:
    j) following said step b), transmitting said data packets from said distribution station to a satellite uplink facility where forward error correction data is added to each of said packets and said step c) is carried out.

5. The method of claim 1, wherein said step c) further includes transmitting said packets to a plurality of headends, and said step g) is simultaneously carried out over a plurality of said land-links, each land-link interconnecting said distribution station and one of said plurality of headends.

6. A system for transmitting video/audio digital file data from a distribution station to a plurality of cable television or CATV headends, said system comprising:

a hard drive storage disposed at said distribution station, said hard drive storage for storing digital video/audio files to be sent to said cable headends;

a file transmitter server (TS) located at said distribution station for retrieving files from said hard drive storage so that said files may be transmitted to said cable headends in less than real time;

means at said distribution station for dividing each of said files into a plurality of data packets, each packet having a data or payload section and a header section;

satellite transmission means for transmitting said data packets via satellite to each of said cable headends, each said headend having receiving means for receiving said data packets from said satellite transmission means;

a land-link connecting each of said cable headends with said distribution station wherein the number of land-links substantially corresponds to the number of cable headends;

error detection means at each of said headends for identifying which, if any, of said packets received from said distribution station are in error and need to be re-transmitted;

re-transmission request means at each of said headends for sending an error signal over a corresponding one of said land-links from said headend to said distribution station, said error signal identifying (positively or negatively) specific packets which need to be re-transmitted from said distribution station to the requesting headend(s);

re-transmission means at said distribution station for re-transmitting said specific packets identified by said re-transmission request means to said requesting headend(s);

decision making means at said distribution station for determining whether said re-transmission of said specific packets is to be done via said land-link or said satellite transmission means; and means at each of said headends for storing said received packet data, said received data to be distributed over a cable television network to a plurality of subscribers at a later time.

7. The system of claim 6, further including an encoder for adding forward error correction data to the packet data before said packets are transmitted by way of said satellite to said cable headends; and wherein said error detection means at each of said headends is further for removing said forward error correction data so as to identify and correct data having FEC errors.

8. The system of claim 7, wherein said decision means is for determining that said re-transmission of said specific packets identified as being in error is to be carried out over said land-link when less than a predetermined number of headends request re-transmission of said packets.

9. The system of claim 8, wherein said decision means decides that if only one headend requests re-transmission of a certain packet, then said certain packet is to be re-transmitted via said land-link.

10. The system of claim 9, wherein each of said land-links include a phone line.

11. The system of claim 6, further including compression means at said distribution station for compressing said digital video/audio file data before it is stored in said hard drive storage and wherein said hard drive storage includes at least one of optical and magnetic disks for storing said files.

12. The system of claim 11, wherein each of said cable headends includes decompressing and digital-to-analog means for transforming said digital file data into analog format to be distributed over said cable network to said plurality of subscribers.

13. The system of claim 6, wherein said re-transmission means re-transmits said specific data packets over at least one of said land-links to at least one of said headends to which said satellite transmission means is also transmitting packets thereby allowing said one headend to simultaneously receive data packets via said land-link and said satellite so as to reduce the time taken to transmit said file data from said distribution station to said one headend.

14. A method of transferring/transmitting a digital data file from a first station to a second station, said method comprising the steps of:

a) storing a plurality of digital data files in a storage area at said first station;

b) instructing a file server at said first station to transmit a file to said second station;

c) retrieving said file via said file server from said storage area at said first station;

d) dividing said file into a plurality of data packets, each packet having a header section and a data payload section;

e) adding error identification data to each of said data packets;

f) transmitting said data packets via satellite or microwave to said second station;

g) analyzing said error identification data from each of said data packets at said second station so as to identify which of said packets are in error and need to be re-transmitted to said second station from said first station;

h) requesting, via a land-link connecting said first and second stations, said first station to re-transmit said packets identified in step g) to be in error;

i) deciding whether to re-transmit via the land-link or via the satellite or microwave and re-transmitting from said first station to said second station via one of said land-link and said satellite or microwave said packets requested in step h) depending upon the transmission medium determined in said deciding step;

j) receiving said re-transmitted packets at said second station by way of a data interface device; and k) storing said re-transmitted data at said second station adjacent the previously transmitted correctly received and stored data of said file.

15. The method of claim 14, wherein said steps f) and i) are at some point carried out substantially simultaneously so as to reduce the time taken to transmit said file from said first station to said second station.

16. The method of claim 14, further comprising the step of:

l) after step e) but before step f), adding FEC satellite error correction data to each of said packets.

17. The method of claim 16, wherein said steps d), e), and g) are performed by way of TCP/IP file transfer protocol.

* * * * *